United States Patent
Peterseim et al.

(12)

(10) Patent No.: US 12,377,722 B2
(45) Date of Patent: Aug. 5, 2025

(54) MOTOR VEHICLE

(71) Applicant: ZF Friedrichshafen AG, Friedrichshafen (DE)

(72) Inventors: Michael Peterseim, Oberdoria (DE); Felix Prauße, Eriskirch (DE); Gerhard Müller, Immenstaad am Bodensee (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 477 days.

(21) Appl. No.: 18/068,827

(22) Filed: Dec. 20, 2022

(65) Prior Publication Data

US 2023/0191890 A1 Jun. 22, 2023

(30) Foreign Application Priority Data

Dec. 20, 2021 (DE) .................... DE102021214699.6

(51) Int. Cl.
*B60K 6/387* (2007.10)
*B60L 53/00* (2019.01)
*B60K 7/00* (2006.01)

(52) U.S. Cl.
CPC .............. *B60K 6/387* (2013.01); *B60L 53/00* (2019.02); *B60K 7/0007* (2013.01)

(58) Field of Classification Search
CPC .......... B60K 6/387; B60K 6/38; B60K 7/007; B60L 53/00
See application file for complete search history.

(56) References Cited

U.S. PATENT DOCUMENTS

| | | | |
|---|---|---|---|
| 9,327,605 B2 * | 5/2016 | Januschevski | .......... H02M 7/40 |
| 2012/0259494 A1 | 10/2012 | Schaeffer et al. | |
| 2013/0234665 A1 | 9/2013 | Januschevski et al. | |

FOREIGN PATENT DOCUMENTS

| | | |
|---|---|---|
| DE | 10 2009 055 249 A1 | 6/2011 |
| DE | 10 2016 209 905 A1 | 12/2016 |
| DE | 10 2016 223 186 A1 | 5/2018 |
| DE | 10 2017 200 903 A1 | 7/2018 |
| DE | 10 2017 202 324 B4 | 10/2018 |
| DE | 10 2019 127 391 A1 | 4/2020 |

OTHER PUBLICATIONS

Office Action dated May 2, 2022 for German Patent Application No. 10 2021 214 699.6 (20 pp.), note: pp. 1 and 2 are English language Explanations to Section C. Result of Determination Document.

* cited by examiner

*Primary Examiner* — John D Walters
(74) *Attorney, Agent, or Firm* — Crowell & Moring LLP

(57) ABSTRACT

A motor vehicle may include a drive train which has at least one electric machine. The electric machine can be connected or is connected to an electric energy store that can be charged with a charging interface from an external charging device, which electric machine is designed to generate a torque and transmit it to an output of the drive train. A decoupling device may be included, which is designed to mechanically decouple the electric machine from the output, when required, in order to carry out a charging operation in a decoupling state. In the decoupling state, a rotational movement of the rotor of the electric machine into a target charging orientation of the rotor is decoupled from the output of the drive train.

20 Claims, 3 Drawing Sheets

MOTOR VEHICLE

RELATED APPLICATION

This application claims the benefit of, and priority to, German Patent Application DE 10 2021 214 699.6, filed Dec. 20, 2021, which is hereby incorporated by reference herein in its entirety.

TECHNICAL FIELD

The invention relates to a motor vehicle comprising a drive train which has at least one electric machine, which can be connected or is connected to an electric energy store that can be charged by means of a charging interface from an external charging device, which electric machine is designed to generate a torque and transmit it to an output of the drive train.

BACKGROUND

Motor vehicles which have electric machines as drive devices, which electric machines can be supplied with electric energy by means of an electric energy store, are known in principle from the prior art. In addition to charging during operation by means of energy recovery, electric energy stores of this type can be charged by an external charging device via a charging interface when the motor vehicle is at a standstill. Examples of such an external charging device can be a charging column or what is referred to as a "wallbox".

For this purpose, there is a known practice of using the inverter of the motor vehicle, which is used for the operation of the electric machine, for charging from a DC voltage source, namely the charging device. For switching the DC/AC inverter to a DC/DC converter, additional inductors are required, and these are expediently provided by the coils of the electric machine.

During the charging operation, the torque caused by the rotor on account of the power supplied for charging the electric energy store depends on the orientation of the rotor or the rotor position. Since the rotor position or the orientation of the rotor is ultimately random when the motor vehicle is parked at the external charging device, it must be ensured that such a torque cannot lead to an unwanted movement of the motor vehicle, thus ensuring that safety problems cannot occur. Nevertheless, for example if the motor vehicle is being held by a parking brake and/or a parking lock or other transmission locks, a torque is caused by the rotor and introduced into the drive train. Since the rotor position or the orientation of the rotor, as described, is random, it is possible in the worst case that torques may be generated in the region of the maximum torque of the electric machine, which torques can have a negative effect on the service life of the components of the drive train.

BRIEF DESCRIPTION

An underlying object of the present embodiments is that of specifying a motor vehicle which is improved in comparison with the above, in which, in particular, the execution of charging operations at an external charging device is improved.

As described at the outset, the present disclosure relates to a motor vehicle which has a drive train having an electric machine and an electric energy store. The electric energy store can be charged via a charging interface of the motor vehicle at an external charging device. The electric machine is used primarily to generate a torque and transmit it to an output of the drive train. The electric machine can thus be understood as a drive device or traction drive. The present embodiments are based on the insight that the motor vehicle has a decoupling device which is designed to mechanically decouple the electric machine from the output, when required, in order to carry out a charging operation in a decoupling state, wherein, in the decoupling state, a rotational movement of the rotor of the electric machine into a target charging orientation of the rotor is decoupled from the output of the drive train.

In this case, the electric machine is designed in such a way that, in a first state, it generates a torque which can be transmitted to an output of the drive train and, in a second state, it transmits current from a charging interface to an electric energy store. The torque can be transmitted via a reducing gear, for example. In the second state, it is possible, for example, to use the coils of the electric motor as part of a boost converter. The second state may also be referred to as the decoupling state.

//first state=traction mode
//decoupling state=state in which charging takes place=second state In other words, the present disclosure provides a decoupling device which can affect mechanical decoupling between the output and the electric machine, in particular can decouple the rotor of the electric machine from the output. Decoupling can be carried out in order to carry out a charging operation. For example, decoupling can be carried out when or before initiating a charging operation, thus making possible a rotational movement of the rotor of the electric machine into a target charging orientation of the rotor, during which rotational movement the rotor is decoupled from the rest of the drive train, in particular from the output. The decoupling device thus makes it possible for the rotor to be rotated, in particular into the target charging orientation, without at the same time producing a torque on the rest of the drive train. Instead of using the rotor in the randomly obtaining position, as is customary in the prior art, in order to carry out the charging operation, the decoupling device is used, as described, to decouple the rotor and thus to carry out a defined rotational movement of the rotor in a manner decoupled from the output of the drive train, thus enabling the rotor to be moved into the target charging orientation.

The target charging orientation designates, in particular, that orientation of the rotor or that rotor position in which the rotor causes a comparatively low torque, in particular no torque, during the charging operation. It is thus possible to ensure that, while the charging operation is being carried out by supplying current to the rotor, no torque, or only a comparatively low torque, is caused. Safety-relevant rotational movements of the rotor and transmission of torque into the drive train, which ultimately have to be blocked, can thus be ruled out. It is thereby possible, on the one hand, to increase safety while carrying out charging operations and to increase the service life of the drive train and its components.

The decoupling device described herein can basically be of any configuration, as long as the decoupling device can carry out mechanical coupling when required, in particular when activated by a control device, thus enabling the rotor to be decoupled from part of the drive train, in particular as close to the rotor as possible from the output of the drive train. The decoupling device can be understood as a "mechanical separation point" since it can carry out a mechanical separation of the drive train. The decoupling device can be embodied as a clutch device or as a freewheel, for example.

If the decoupling device is embodied as a clutch device, it can optionally be embodied as a positive clutch device or as a friction clutch, more specifically as a claw clutch or multi-disk clutch. As described, the decoupling device must allow decoupling between the rotor and the output, it being sufficient to allow decoupling in a defined direction of rotation, for example when a freewheel is used. The decoupling device thus allows the rotor angle to be changed without applying torque to the wheels. If, for example, the motor vehicle is put into a charging mode, the decoupling device can first of all cancel the coupling of the rotor, thus enabling the rotor to be brought into the desired target charging orientation, in which the charging operation can advantageously be carried out, with no torque or only a low torque being generated by the charging operation and applied to the rotor.

According to one embodiment of the motor vehicle, provision can be made for the decoupling device to be designed to lock the rotor of the electric machine after the adoption of the target charging orientation, in particular by means of a separate locking device and/or by establishing the coupling to the output. As described, the rotor is primarily decoupled from the output of the drive train in order to carry out a rotational movement which transfers the rotor into the desired target charging orientation. Once the target charging orientation of the rotor has been adopted, the decoupling device can lock the rotor in the target charging orientation.

For this purpose, the decoupling device can reestablish the previously canceled coupling of the rotor, i.e. can recouple the rotor to the rest of the drive train. It is likewise possible to provide a separate locking device, for example a parking brake or a parking lock or the like, which acts additionally or alternatively on the rotor in order to lock the latter. The separate locking device can also be integrated into the electric machine in such a way that the rotor can be locked in order to prevent the rotor from being deflected out of the target charging orientation during the charging operation. The locking of the rotor after the adoption of the target charging orientation has the effect, in particular, of preventing rotational movements of the rotor when the charging operation is started, e.g. due to transient processes. The rotor is therefore locked, thus also enabling rotational movements due to transient processes or deviations from the target charging orientation in the charging operation, which could cause a departure from the target charging orientation, to be blocked.

According to a further embodiment of the motor, provision can be made for the decoupling device to be designed to brace the rotor of the electric machine after the adoption of the target charging orientation by applying a defined preloading torque in the drive train. The bracing of the rotor in the drive train from the target charging orientation can, in particular, allow for the preloading torque to be generated by means of the supply of current during the charging operation. In other words, the target charging orientation can be selected in such a way that, in particular after the rotor has been locked, by coupling to the rest of the drive train for example, a comparatively low torque is produced which preloads the rotor in a defined manner in the drive train.

By means of the defined preloading or the application of the defined preloading torque, in particular oscillation of the torque or a torque oscillation about the zero point during the charging operation, is prevented. By applying the preloading torque, a preferred direction is impressed on the rotor, in which the comparatively defined small torque can be applied. The preloading torque can be, for example, <10% of the maximum machine torque, it being possible to aim for a range of less than 5% of the maximum machine torque. It is possible, for example, to use a freewheel as a decoupling device, or a freewheel can form a component of the decoupling device, it being possible to ensure by applying the preloading torque that the rotor remains locked with respect to the freewheel, which is connected to the rest of the drive train. Ultimately, the choice of preloading torque can be made according to the specific electric machine and the drive train. It is possible, for example, to factor in the point at which the decoupling device or the rotor is arranged in the drive train. By virtue of the fact that the rotor is preloaded by the defined preloading torque, in particular deviations from the target charging orientation which bring about comparatively greater torques are prevented.

As described above, the decoupling device can in principle have any desired clutch devices. According to one embodiment, the decoupling device can have at least one claw clutch or can be designed as such, wherein the claw clutch has a defined number of teeth, in particular 30 to 70 teeth, wherein a control device of the motor vehicle is designed to determine the target charging orientation in accordance with a current tooth arrangement. When using the claw clutch, the number of teeth and the arrangement of the tooth systems of the counterparts or of the individual claws of the claw clutch relative to one another determine which relative orientations can be adopted.

In other words, a first claw, which is connected to the rotor of the electric machine, cannot be engaged in any arbitrary orientation with a second claw, which is connected to the output of the drive train. The tooth systems each have teeth and tooth gaps, wherein the two claws can only be brought into engagement if the teeth of the first claw can be introduced into tooth gaps of the second claw and vice versa. The control device described can determine the target charging orientation into which the rotor is to be placed for the charging operation in accordance with a current tooth arrangement. For example, it is possible to determine which orientation the rotor should ideally be brought into and which target charging orientation can be achieved. In other words, it is possible to determine which tooth engagement or which rotor orientation comes closest to the desired target charging orientation. If the rotor is locked, it is possible to select the tooth engagement or the orientation of the first claw relative to the second claw which permits the closest possible approximation to the target charging orientation of the rotor.

As described above, the rotor can in principle be preloaded in the drive train after or for adoption of the target charging orientation, in order to avoid oscillations of the torque about the zero point. According to a further embodiment, the above-described or a further control device of the motor vehicle can be designed to set the target charging orientation by preloading the rotor. In other words, the desired preloading of the rotor can be included in the definition or determination of the target charging orientation. This does not affect the initially described principle of adopting the target charging orientation. Once the target charging orientation has been adopted, the torque exerted on the rotor or caused by the rotor should nevertheless be comparatively low although it predetermines a preferred direction for the rotor and avoids oscillation about the zero point of the torque. In other words, the target charging orientation is selected in a defined manner in such a way that the rotor is preloaded by a low torque or preloading torque in the drive train.

The refinements relating to the preloading of the rotor and the consideration of the possible tooth engagements can be combined with one another in any desired manner. In other words, it is possible to take into account which tooth engagements are fundamentally possible and what preloading of the rotor is desired. It is thus possible to determine the target charging orientation or the possible target charging orientations of the rotor, which can depend on a number of pole pairs or, in principle, on a symmetry of the rotor. Subsequently, it is possible to determine which tooth engagements of the first claw and the second claw make it possible to adopt the target charging orientation(s).

In this case, it is additionally possible to take into account whether a preload should be applied or can be applied to the rotor, for example in order to correct target positions which are predetermined by the claw engagements and do not correspond exactly to the target charging orientation. From the combination of possible tooth engagements and a possible preload on the rotor, the target charging orientation can thus be carried out for virtually all rotor angles. This can involve defining an interval of possible preloading torques, enabling a preloading torque to be selected from the interval of the possible preloading torques in accordance with the possible tooth engagements in order to achieve the target charging orientation, starting from a target position. The preloading torques can be applied in both directions of rotation of the rotor, thus making it possible to exert a positive or negative preloading torque to achieve the target charging orientation.

In particular, it is also possible to allow for the preloading torque not to fall below a minimum torque. For this purpose, it is possible, for example, to implement a tooth engagement which does not represent the tooth engagement closest to the target charging orientation, but, for example, is at a distance from the target charging orientation corresponding to a rotation of the first claw relative to the second claw by a further tooth engagement. The described tooth engagement can be selected to enable at least the minimum torque as the preloading torque to be applied in order subsequently to move the rotor into the target charging orientation.

As described, the motor vehicle described can have at least one vehicle axle driven or drivable by the electric machine. According to a further embodiment, the motor vehicle can furthermore have at least two driven or drivable vehicle axles. In this case, the decoupling device can be assigned to that vehicle axle whose inverter is designed or used to carry out a charging operation. This embodiment envisages that the mechanical separation point is provided on the rotor of that electric machine whose inverter is also used for carrying out the charging operation. For example, a first vehicle axle can be driven by a first electric machine, to which a first inverter is assigned. A second vehicle axle can be driven by a second electric machine controlled by a second inverter. Depending on whether the electric energy store is charged by the components of the first vehicle axle or the second vehicle axle in a charging operation, the decoupling device can be assigned in the first or the second vehicle axle.

As described, the motor vehicle can have one or more control devices. At least one of the control devices can be designed to control the at least one inverter in order to carry out the charging operation and/or to control the decoupling device and/or to control a separate decoupling device of the coupling device. The control device can, for example, control the inverter in such a way that the currents conducted through the inductors of the rotor can be adapted to the charging operation or the reaction arising therefrom. Furthermore, the decoupling device can be controlled, for example in order to decouple the rotor from the rest of the drive train or to reestablish the coupling. The above-described separate coupling device, which can be provided, in particular, for locking the rotor, can likewise be controlled by the control device. The locking device can be embodied as a parking lock or as a parking brake, for example.

The motor vehicle can furthermore be developed inasmuch as at least one detection device is provided, which is designed to detect a coupling state of the rotor. In other words, the detection device can detect whether the rotor is coupled to the rest of the drive train or whether the rotor is coupled to the output or is decoupled therefrom. It is thus possible to detect whether the coupling between the rotor and the output is established or whether it is decoupled, for example by appropriate transfer of the decoupling device into the decoupling state. This makes it possible to determine whether there is a rotary connection between the electric machine and the wheels or whether this has been interrupted. The detection device can furthermore be designed to detect the position of the rotor or the orientation of the rotor or the rotor position. For this purpose, the detection device can, for example, have recourse to a rotor position sensor or can determine the position by means of current sensors. In order to determine the target charging orientation, it is possible, for example, to refer to a table which can be stored in a control device. Depending on the number of pole pairs or symmetry of the rotor, a plurality of target charging orientations or a plurality of rotor angles may be possible.

At least one control device of the motor vehicle can change the target charging orientation if a change in the rotor position is detected, in particular during a charging operation. In other words, the control device can adapt a control intervention, in particular can change the control of the inverter, for example if a rotational movement of the rotor is detected by the detection device during the charging operation, in order to prevent an unwanted rotational movement of the rotor. Furthermore, corresponding control signals can be sent to the decoupling device, for example in order to lock the rotor.

In addition, certain embodiments relate to a method for carrying out a charging operation of an electric energy store of a motor vehicle, in particular of an above-described motor vehicle, wherein, in order to carry out a charging operation, an electric machine of the motor vehicle is transferred into a decoupling state, in which the electric machine, in particular the rotor, is decoupled from an output of the motor vehicle, wherein, in the decoupling state, a rotational movement of the rotor of the electric machine into a target charging orientation is carried out, during which rotational movement the rotor is decoupled from the output. In other words, the method can be carried out on the above-described motor vehicle. All the advantages, details and features which have been described with reference to the motor vehicle can be applied in full to the method.

BRIEF DESCRIPTION OF THE DRAWINGS

Certain embodiments are explained below by means of exemplary embodiments with reference to the figures. The figures are schematic illustrations and.

BRIEF DESCRIPTION OF THE DRAWINGS

Figure 1:
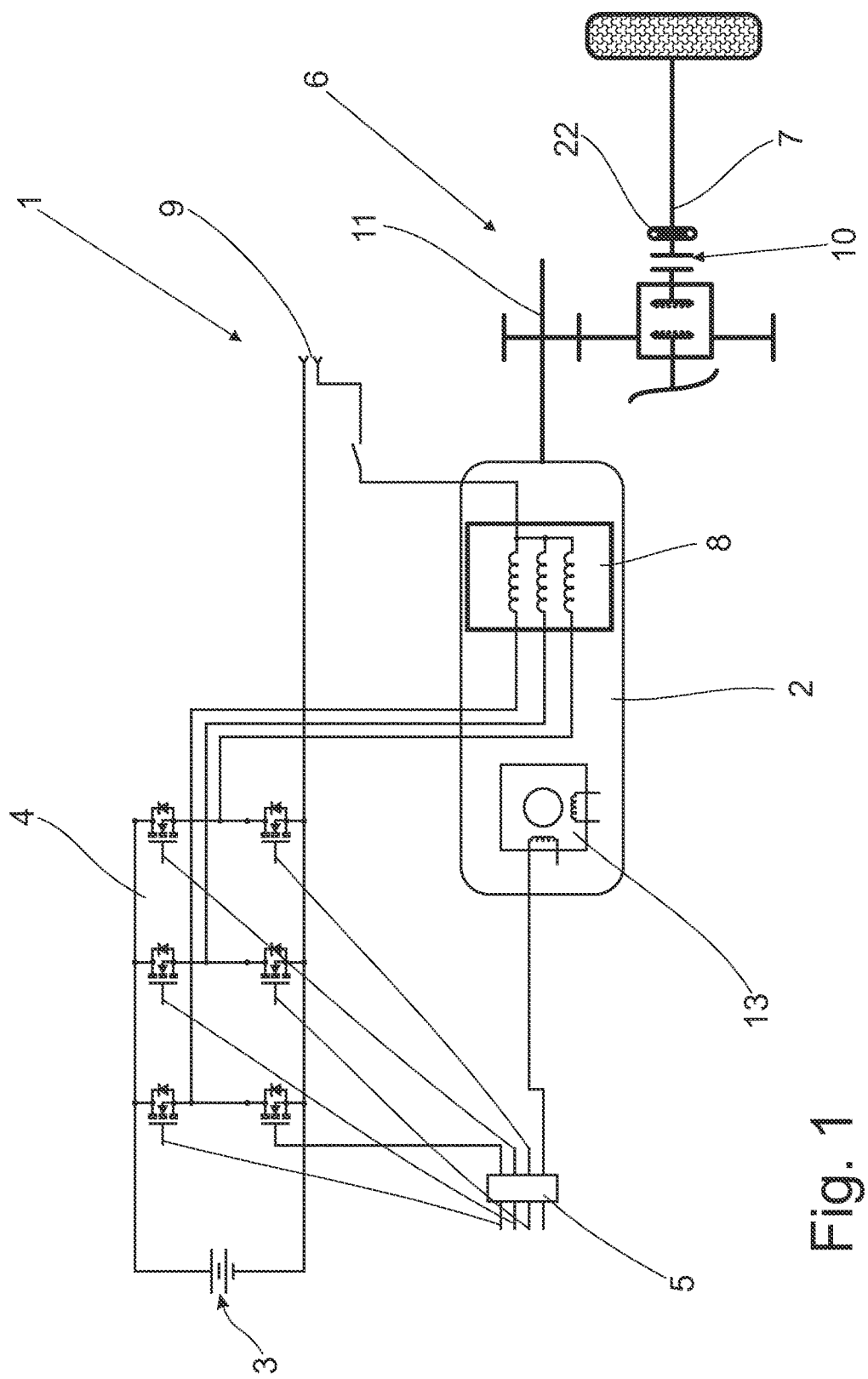
FIG. 1 shows a basic illustration of a motor vehicle according to a first exemplary embodiment.

FIG. 1 shows a schematic segment of a motor vehicle 1, which has an electric machine 2, an electric energy store 3, an inverter 4 and a control device 5. The electric machine 2 is integrated into a drive train 6 of the motor vehicle 1, which has an output 7 which, as illustrated merely by way of example, leads to a wheel. The electric machine 2 has a schematically indicated rotor 8, the coils of which can be controlled or energized by the inverter 4. Furthermore, the motor vehicle 1 has a charging interface 9, via which the motor vehicle 1, in particular the electric energy store 3, can be connected to an external charging device (not illustrated specifically), for example a charging column.

The motor vehicle 1 also has a decoupling device 10 which is designed to uncouple or decouple the electric machine 2, in particular the rotor 8, from the rest of the drive train 6. For example, the decoupling device 10 is designed as a freewheel or as a clutch device, in particular as a positive clutch device. The arrangement of the decoupling device 10 in a side shaft assigned to the wheel is merely an example. It would likewise be possible, for example, for a corresponding decoupling device 10 to be arranged in an output shaft 11 of the electric machine 2. The output 7 refers to the part of the drive train 6 which lies in the torque flow between the wheel and the rotor 8. In principle, any part of the drive train 6 to which torque can be applied by the electric machine 2 when the decoupling device 10 is closed and from which the rotor can be decoupled can be understood as an output.

The decoupling device 10 thus decouples the rotor 8 from the rest of the drive train 6, thus enabling the rotor 8 to be rotated without transmitting torque to the rest of the drive train 6, in particular without transmitting torque to the output 7 or the wheels.

If a charging operation is to be carried out, in which a current from the external charging device is used to charge the electric energy store 3 of the motor vehicle 1, the inverter 4 is ultimately used as a DC/DC converter, the coils of the rotor 8 being used as inductors. The control device 5 is designed to individually control the individual switches of the inverter 4, for example three high-side and three low-side switches of the inverter 4.

In order to prevent a torque being generated during the conduction of the current through the rotor 8 and being transmitted to the output 7 or the drive train 6, which would either lead to a movement of the motor vehicle 1 or could impose a load on the drive train 6 if the motor vehicle 1 were being held stationary, the rotor 8 is transferred into a target charging orientation. For this purpose, the rotor 8 is first decoupled from the rest of the drive train 6 by the decoupling device 10. Here, the decoupling device 10 forms a mechanical separation point which effects mechanical decoupling of the rotor 8. Thus, no torque is applied to the rest of the drive train 6 during the rotational movement of the rotor 8. The rotor 8 can thus be rotated and brought into a target charging orientation as desired.

The decoupling device 10 can then restore the coupling to the drive train 6. For example, locking of the rotor 8 can be brought about thereby or, additionally or alternatively, a separate locking device (not shown specifically) can be used to produce the locking effect on the rotor 8. A parking brake or a parking lock 22 or a means of the electric machine 2 which can mechanically lock the rotor 8 can be taken as an example of a separate locking device.

In the locked state or the recoupled state of the rotor 8, the charging operation can be carried out. Since the rotor 8 has been brought into the target charging orientation, it is ensured that no torque or only a low torque, for example below 10% of the maximum machine torque, is applied to the rotor 8 or the output shaft 11 by the supply of current in the charging operation.

The control device 5 is furthermore coupled to a detection device 13. The detection device 13 is designed to detect the orientation of the rotor 8 and, purely by way of example, is connected to a rotor position sensor. In addition or as an alternative to the rotor position sensor, it is likewise possible for the detection device 13 to be able to detect the orientation of the rotor 8 based on sensor values of current sensors. If, for example, a movement of the rotor 8 during the charging operation is detected in the detection device 13, the inverter 4 can be correspondingly activated by means of the control device 5 in order to adapt the charging operation, thereby making it possible to reduce rotational movements or the generation of torque on the rotor 8 to the appropriate extent.

Figure 2:
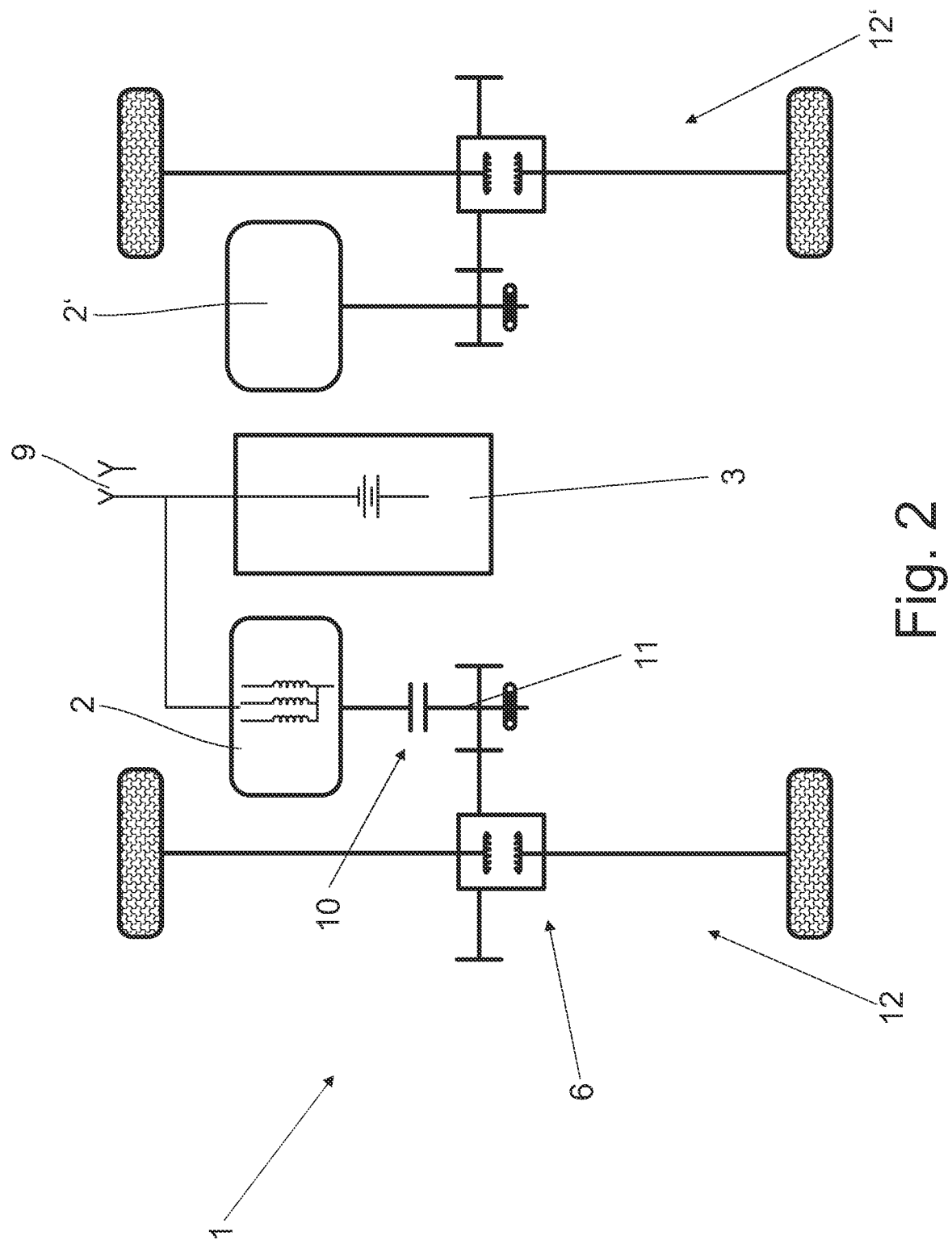
FIG. 2 shows a basic illustration of a motor vehicle according to a second exemplary embodiment.

FIG. 2 shows a second exemplary embodiment of a motor vehicle 1, which has two driven or drivable vehicle axles 12, 12'. Thus, an electric machine 2, 2' is assigned to each of the vehicle axles 12, 12'. In this exemplary embodiment, only the electric machine 2 assigned to the first vehicle axle 12 is used to charge the common electric energy store 3 by which the two electric machines 2, Z can be supplied. In this case, moreover, only the inverter 4 which is assigned to electric machine 2 is used as a DC/DC converter. The decoupling device 10 is therefore arranged in the part of the drive train 6 which has vehicle axle 12. As illustrated, in this exemplary embodiment the decoupling device 10 is arranged closer to the electric machine 2, e.g. directly at or on the drive shaft 11. The basic functioning of the decoupling device 10 and the performance of the charging operation can be taken in their entirety from the description of FIG. 1.

Figure 3:
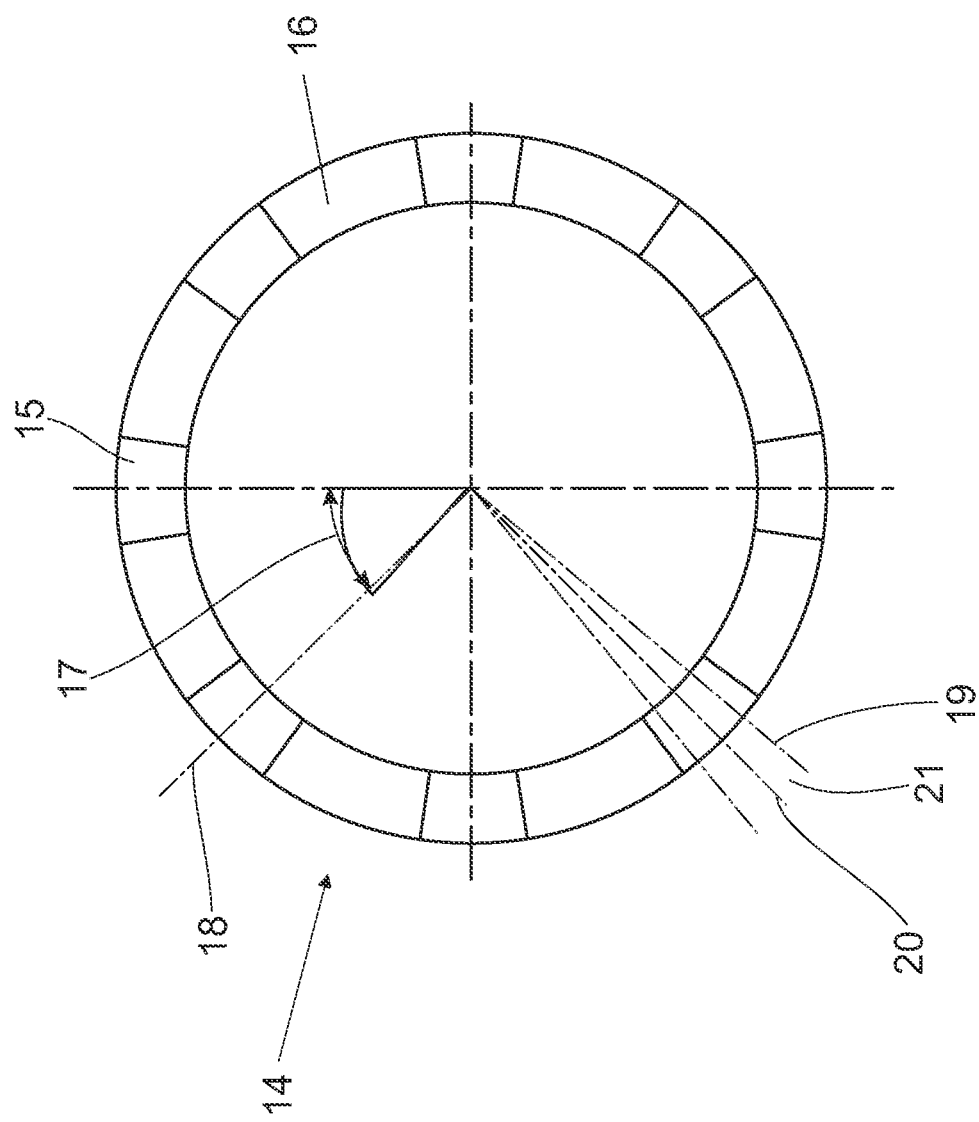
FIG. 3 shows a basic illustration of a target charging orientation.

FIG. 3 shows a part of the decoupling device 10 in an axial illustration. As described, the decoupling device 10 can in principle also be designed as a clutch device, if desired, in particular as a positive clutch device, e.g. as a claw clutch. In this case, the decoupling device 10 can comprise a first and a second claw, which can be brought into engagement with one another, it being possible for the engagement to be separated in order to decouple the rotor.

Purely by way of example, the figure illustrates a first claw 14, which can be brought into engagement with a second claw (not illustrated specifically). The first claw 14 has teeth 15, which are distributed on the first claw 14 in the circumferential direction and are spaced apart by tooth gaps 16. In this embodiment, the two claws are of dissimilar design, i.e. the teeth 15 are of smaller design in the circumferential direction than the teeth of the second claw, which correspond to the tooth gaps 16 of the first claw 14. The embodiment shown is merely an example. Instead of the two claws, the transmission element which is connected to the rotor 8 may also be a sliding sleeve or other transmission elements which permit selective coupling to the output 7.

When the first claw 14 is coupled to the second claw, the teeth 15 of the first claw 14 engage in the tooth gaps of the second claw. Correspondingly, the teeth of the second claw engage in the tooth gaps 16 of the first claw 14. The tooth gaps 16 thus define angular regions in which engagement of the corresponding teeth is possible. In other words, the decoupling device 10 can only be closed again if the teeth 15 can engage in corresponding tooth gaps. Since the orientation of the first claw 14 relative to the second claw is ultimately the random product of the movement of the motor vehicle 1 and of the rotor 8, the orientation or the possible engagement positions can be included in the determination of the target charging orientation.

For example, it is possible to determine which engagement positions are fundamentally possible and into which position or by what rotor angle the rotor 8, which is coupled to the first claw 14 for example, must be rotated in order to achieve the target charging orientation. Purely by way of example, the figure shows an angle 17 by which the center points of the teeth 15 are spaced apart in the circumferential direction. As can be seen, the number of teeth 15 and their extent in the circumferential direction determine the angle 17. The number of teeth 15 or of the tooth gaps corresponding thereto accordingly determines the positions in which the individual teeth 15 can be brought into engagement with the corresponding tooth gaps.

Purely by way of example, the figure illustrates a starting position 18, in which the rotor 8 and, with the rotor 8, the first claw 14 are stationary, e.g. the situation in which the motor vehicle 1 is parked for charging. Furthermore, FIG. 3 shows a target charging orientation 19 of the first claw 14, wherein the target charging orientation 19 also applies to the rotor 8, which, as described, is connected to the first claw 14. The control device 5 can then determine a target position 20, into which the first claw 14 can be rotated together with the rotor 8 relative to the second claw. Ultimately, this determines the tooth engagement which is to be used for the adoption of the target charging orientation 19.

In addition, the figure illustrates a preloading angle 21 by which the drive train 6 can be rotated by the application of a defined preloading torque to the rotor 8 in order to adopt the target charging orientation 19. The preloading of the rotor 8 or of the drive train 6 affects the transmission ratios and elasticities present in the drive train 6. Fundamentally, it is possible here for a rotational movement of the rotor 8 by a defined angle, referred to as the preloading angle 21, to be performed in order to preload the rotor 8. For this purpose, a defined low preloading torque, e.g. below 10% of the maximum machine torque of the electric machine 2, can be applied. This makes it possible, in particular, for vibrations or fluctuations of the rotor 8 or of the torque about a zero point of the torque to be prevented.

It is possible, in particular, for the application of the preloading torque to be applied while taking into account the possible tooth engagements. Depending on the angle by which the rotor 8 must be rotated in order to achieve the target charging orientation 19, it may be necessary to apply a certain preloading angle 21. Here, the preloading angle 21 can vary, and therefore, after the adoption of the desired tooth engagement, e.g. the target position 20 which is closest to the target charging orientation 19, the remaining angle is applied by the preload, thus enabling the target charging orientation 19 to be reached as optimally as possible. Arbitrarily fine subdivisions of the angle are possible, depending on how many teeth the claw 14 has. If a minimum torque is to be implemented as the preloading torque, it is also possible to choose a target position 20 which is not the tooth engagement closest to the target charging orientation 19. Instead, an adjacent tooth engagement can be chosen as the target position 20, thus enabling the minimum torque to be implemented as the preloading torque.

The advantages, details and features shown in the individual exemplary embodiments can be swapped, transferred and combined as desired.

REFERENCE SIGNS 1 motor vehicle
2 electric machine
3 electric energy store
4 inverter
5 control device
6 drive train
7 output
8 rotor
9 charging interface
10 decoupling device
11 output shaft
12, 12' vehicle axle
13 detection device
14 claw
15 tooth
16 tooth gap
17 angle
18 starting position
19 target charging orientation
20 target position
21 preloading angle
22 parking lock

We claim:

1. A motor vehicle, comprising:
a drive train which has at least one electric machine, wherein the electric machine is connectable to an electric energy store that is chargeable with a charging interface from an external charging device,
wherein in a first state, the electric machine generates a torque which is transmittable to an output of the drive train,
wherein in a second state, the electric machine transmits current from a charging interface to an electric energy store;
a decoupling device which is configured to mechanically decouple the electric machine from the output in order to carry out a charging operation in a decoupling state,
wherein, in the decoupling state, a rotational movement of the rotor of the electric machine into a target charging orientation of the rotor is decoupled from the output of the drive train.

2. The motor vehicle of claim 1, wherein the decoupling device is configured to lock the rotor of the electric machine in the target charging orientation with a at least one of a locking device and by establishing the coupling to the output.

3. The motor vehicle of claim 1, wherein the decoupling device is configured to brace the rotor of the electric machine after the adoption of the target charging orientation by applying a defined preloading torque in the drive train.

4. The motor vehicle of claim 1, wherein the decoupling device has at least one claw clutch.

5. The motor vehicle of claim 4, wherein the claw clutch has from 30 to 70 teeth.

6. The motor vehicle of claim 4, wherein a control device of the motor vehicle is configured to determine the target charging orientation in accordance with a tooth arrangement of the claw clutch.

7. The motor vehicle of claim 1, wherein a control device of the motor vehicle is configured to set the target charging orientation by preloading the rotor.

8. The motor vehicle of claim 1, further comprising at least two vehicle axles, wherein the decoupling device is assigned to that vehicle axle whose inverter is configured to carry out a charging operation.

9. The motor vehicle of claim 1, further comprising at least one control device which is configured to control the at least one inverter in order to carry out the charging operation and/or to control the decoupling device and/or to control a separate locking device of the decoupling device.

10. The motor vehicle of claim 1, further comprising at least one detection device, which is configured to detect a coupling state of the rotor.

11. The motor vehicle of claim 10, wherein at least one control device is configured to change the target charging orientation if a change in a rotor position is detected during a charging operation.

12. A method for assembling at least a portion of a drive train of a motor vehicle, the method comprising:
- coupling a drive train component to at least one electric machine, wherein the electric machine is connectable to an electric energy store that is chargeable with a charging interface from an external charging device,
- wherein in a first state, the electric machine generates a torque which is transmittable to an output of the drive train,
- wherein in a second state, the electric machine transmits current from a charging interface to an electric energy store,
- wherein the motor vehicle includes a decoupling device which is configured to mechanically decouple the electric machine from the output in order to carry out a charging operation in a decoupling state,
- wherein, in the decoupling state, a rotational movement of the rotor of the electric machine into a target charging orientation of the rotor is decoupled from the output of the drive train.

13. The method of claim 12, wherein the decoupling device is configured to lock the rotor of the electric machine in the target charging orientation with a at least one of a locking device and by establishing the coupling to the output.

14. The method of claim 12, wherein the decoupling device is configured to brace the rotor of the electric machine after the adoption of the target charging orientation by applying a defined preloading torque in the drive train.

15. The method of claim 12, wherein the decoupling device has at least one claw clutch.

16. The method of claim 15, wherein the claw clutch has from 30 to 70 teeth.

17. The method of claim 15, wherein a control device of the motor vehicle is configured to determine the target charging orientation in accordance with a tooth arrangement of the claw clutch.

18. The method of claim 12, wherein a control device of the motor vehicle is configured to set the target charging orientation by preloading the rotor.

19. The method of claim 12, wherein the motor vehicle includes at least one detection device which is configured to detect a coupling state of the rotor.

20. The method of claim 19, wherein at least one control device is configured to change the target charging orientation if a change in a rotor position is detected during a charging operation.

* * * * *